United States Patent
Kang et al.

(10) Patent No.: US 9,054,382 B2
(45) Date of Patent: Jun. 9, 2015

(54) BINDER FOR SECONDARY BATTERY EXHIBITING EXCELLENT ADHESION FORCE

(75) Inventors: MinAh Kang, Daejeon (KR); Young-Min Kim, Daejeon (KR); Bhom Ri Kim, Daejeon (KR); Ok Sun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 87 days.

(21) Appl. No.: 13/328,834

(22) Filed: Dec. 16, 2011

(65) Prior Publication Data

US 2012/0183848 A1   Jul. 19, 2012

Related U.S. Application Data

(63) Continuation of application No. PCT/KR2010/008876, filed on Dec. 11, 2010.

(30) Foreign Application Priority Data

Feb. 26, 2010  (KR) ................. 10-2010-0017560

(51) Int. Cl.
  *H01M 4/62* (2006.01)
  *H01M 4/13* (2010.01)
  *C08F 301/00* (2006.01)
  *H01M 4/04* (2006.01)
  *H01M 10/0525* (2010.01)

(52) U.S. Cl.
  CPC .......... *H01M 4/622* (2013.01); *H01M 2220/20* (2013.01); *H01M 2220/30* (2013.01); *H01M 4/0404* (2013.01); *H01M 10/0525* (2013.01)

(58) Field of Classification Search
  CPC ................ H01M 4/04; H01M 4/0404; H01M 4/621–4/623; H01M 10/052; H01M 10/0525; H01M 2220/20; H01M 2220/30
  USPC ................ 429/217; 252/182.1; 526/209, 216, 526/307.6
  See application file for complete search history.

(56) References Cited

U.S. PATENT DOCUMENTS

| | | | |
|---|---|---|---|
| 6,756,153 B1 * | 6/2004 | Yamamoto et al. | ........... 429/217 |
| 6,881,517 B1 * | 4/2005 | Kanzaki et al. | ............... 429/217 |
| 2002/0068783 A1 * | 6/2002 | Maeda et al. | ................ 524/474 |
| 2003/0113626 A1 | 6/2003 | Maeda et al. | |
| 2006/0058462 A1 | 3/2006 | Kim et al. | |
| 2007/0212610 A1 | 9/2007 | Sonobe et al. | |

FOREIGN PATENT DOCUMENTS

| | | | |
|---|---|---|---|
| CN | 1720628 A | 1/2006 | |
| EP | 1249882 A | 10/2002 | |
| JP | 2003-268053 A | 9/2003 | |
| KR | 10-0491026 B1 | 5/2005 | |
| KR | 10-2007-0001186 A | 1/2007 | |
| KR | 10-0711975 B1 | 5/2007 | |
| KR | 10-2008-0062966 A | 7/2008 | |
| KR | 10-2009-0017939 A | 2/2009 | |
| KR | 10-2009-0019630 A | 2/2009 | |
| KR | 2009019630 A * | 2/2009 | ............. H01M 4/62 |

OTHER PUBLICATIONS

Derwent Abstract for Kim et al., KR 2009-019630 A.*
Machine translation for Kim et al., KR 2009-019630 A.*
International Search Report, dated Jul. 29, 2011 in PCT/KR2010/008876.

* cited by examiner

*Primary Examiner* — Edu E Enin-Okut
(74) *Attorney, Agent, or Firm* — Birch, Stewart, Kolasch & Birch, LLP

(57) ABSTRACT

Provided is a binder for secondary battery electrodes comprising polymer particles obtained by polymerizing (a) a (meth)acrylic acid ester monomer; (b) at least one monomer selected from the group consisting of an acrylate monomer, a vinyl monomer and a nitrile monomer; and (c) a (meth)acrylamide monomer and an unsaturated monocarbonic acid monomer, with two or more cross-linking agents with different molecular weights. Based on the combination of specific components, the binder basically improves stability of an electrode in the process of fabricating the electrode, thus providing secondary batteries with superior cycle properties.

18 Claims, No Drawings

BINDER FOR SECONDARY BATTERY EXHIBITING EXCELLENT ADHESION FORCE

CROSS REFERENCE TO RELATED APPLICATIONS

This application is a Continuation of PCT/KR2010/008876 filed on Dec. 11, 2010, which claims priority of Application No. 10-2010-0017560 filed in Republic of Korea on Feb. 26, 2010, all of which are hereby expressly incorporated by reference into the present application.

TECHNICAL FIELD

The present invention relates to a binder for secondary battery electrodes. More specifically, the present invention relates to a binder for secondary battery electrodes comprising polymer particles obtained by polymerizing a (meth)acrylic acid ester monomer; at least one monomer selected from the group consisting of an acrylate monomer, a vinyl monomer and a nitrile monomer; and a (meth)acrylamide monomer and an unsaturated monocarbonic acid monomer, with two or more cross-linking agents with different molecular weights.

BACKGROUND ART

Rapidly increasing use of fossil fuels has led to an increase in demand for use of alternative or clean energy. In light of such trends, generation and storage of electricity using electrochemical reaction are a very active area of research.

In recent years, representative examples of electrochemical devices using electrochemical energy are secondary batteries, and application range thereof continues to expand.

Recently, technological development and increased demand associated with portable equipment such as portable computers, cellular phones and cameras have brought about an increase in the demand for secondary batteries as energy sources. Among these secondary batteries, lithium secondary batteries having high energy density and operating electric potential, long lifespan and low self-discharge have been actively researched and are commercially available and widely used.

In addition, increased interest in environmental issues has led to a great deal of research into electric vehicles, hybrid electric vehicles or the like as alternatives to vehicles using fossil fuels such as gasoline vehicles and diesel vehicles. These electric vehicles and hybrid electric vehicles generally use nickel-metal hydride secondary batteries as power sources. However, a great deal of study associated with lithium secondary batteries with high energy density and discharge voltage is currently underway and some are commercially available.

Conventional typical lithium secondary batteries use graphite as an anode active material. Lithium ions of a cathode are repeatedly intercalated into and de-intercalated from the anode to realize charge and discharge. The theoretical capacity of batteries may vary depending upon the type of the electrode active material, but generally cause deterioration in charge and discharge capacity in the course of the cycle life of the battery.

The primary reason behind such phenomenon is that separation between an electrode active material or separation between the electrode active material and a current collector due to volume variation of the electrode, as batteries are charged and discharged, results in insufficient realization of function of the active material. In addition, in the process of intercalation and de-intercalation, lithium ions intercalated into the anode cannot be sufficiently de-intercalated and active sites of the anode are thus decreased. For this reason, charge/discharge capacity and lifespan of batteries may decrease as the batteries are cycled.

In particular, in order to improve discharge capacity, in the case where natural graphite having a theoretical discharge capacity of 372 mAh/g is used in combination with a material such as silicon, tin or silicon-tin alloys having high discharge capacity, volume expansion of the material considerably increases, in the course of charging and discharging, thus causing isolation of the anode material from the electrode material. As a result, battery capacity disadvantageously rapidly decreases over repeated cycling.

Accordingly, there is an increasing demand in the art for binder and electrode materials which can prevent separation between the electrode active material, or between the electrode active material and the current collector upon fabrication of electrodes via strong adhesion and can control volume expansion of electrode active materials upon repeated charging/discharging via strong physical properties, thus improving structural stability of electrodes and thus performance of batteries.

Polyvinylidene difluoride (PVdF), a conventional solvent-based binder, does not satisfy these requirements. Recently, a method for preparing a binder, in which styrene-butadiene rubber (SBR) is polymerized in an aqueous system to produce emulsion particles and the emulsion particles are mixed with a neutralizing agent, or the like, is used and is commercially available. Such a binder is advantageous in that it is environmentally friendly and reduces use of the binder and thereby increasing battery capacity. However, this binder exhibits improved adhesion maintenance due to the elasticity of rubber, but has no great effect on adhesion force.

Accordingly, there is an increasing need for development of binders which improves cycle properties of batteries, contributes to structural stability of electrodes and exhibits superior adhesion strength.

DISCLOSURE

Technical Problem

Therefore, the present invention has been made to solve the above and other technical problems that have yet to be resolved.

As a result of a variety of extensive and intensive studies and experiments to solve the problems as described above, the inventors of the present invention have developed a binder for secondary battery electrodes comprising polymer particles obtained by polymerizing a specific combination of monomers with two or more cross-linking agents with different molecular weights, as described below, and confirmed that the use of this binder contributes to improvement in cycle properties of batteries and adhesion strength. The present invention was completed based on this discovery.

Technical Solution

Accordingly, the binder for secondary battery electrodes according to the present invention comprises polymer particles obtained by polymerizing (a) a (meth)acrylic acid ester monomer; (b) at least one monomer selected from the group consisting of an acrylate monomer, a vinyl monomer and a nitrile monomer; and (c) a (meth)acrylamide monomer and an unsaturated monocarbonic acid monomer, with two or more cross-linking agents with different molecular weights.

In accordance with the binder of the present invention, a specific combination of monomers provides superior adhesion strength and improved adhesion maintenance and a cross-linking agent having a low molecular weight improves binder physical properties, thus improving cycle characteristics, and a cross-linking agent having a high molecular weight improves flexibility of the binder, thus improving adhesion strength.

In a preferred embodiment, based on the total weight of the binder, (a) monomer may be present in an amount of 10 to 98% by weight, (b) monomer may be present in an amount of 1 to 60% by weight, and (c) monomer may be present in an amount of 1 to 20% by weight. More preferably, (a) monomer is present in an amount of 20 to 95% by weight, (b) monomer is present in an amount of 3 to 50% by weight, and (c) monomer is present in an amount of 2 to 15% by weight. These content ranges may be suitably varied depending on the characteristics of the monomers and physical properties of the binder.

For example, the (meth)acrylic acid ester monomer, as (a) monomer, may be at least one monomer selected from the group consisting of methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethyl hexyl acrylate, 2-hydroxy ethyl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, n-ethyl hexyl methacrylate, 2-ethyl hexyl methacrylate, hydroxyl ethyl methacrylate and hydroxyl propyl methacrylate.

For example, the acrylate monomer, as (b) monomer, may be selected from the group consisting of methacryloxy ethylethylene urea, β-carboxy ethylacrylate, aliphatic monoacrylate, dipropylene diacrylate, ditrimethylolpropane tetraacrylate, hydroxyethyl acrylate, dipentaerythritol hexaacrylate, pentaerythritoltriacrylate, pentaerythritoltetraacrylate, lauryl acrylate, cetyl acrylate, stearyl acrylate, lauryl methacrylate, cetyl methacrylate and stearyl methacrylate.

The vinyl monomer, as (b) monomer, may be at least one selected from the group consisting of styrene, α-methylstyrene, β-methylstyrene, p-t-butylstyrene, divinyl benzene and mixtures thereof.

The nitrile monomer, as (b) monomer, may be at least one selected from the group consisting of succinonitrile, sebaconitrile, fluoronitrile, chloronitrile, acrylonitrile, methacrylonitrile and the like. More preferably, the nitrile monomer is at least one selected from the group consisting of acrylonitrile, methacrylonitrile and mixtures thereof.

The (meth)acrylamide monomer, as (c) monomer, may be at least one selected from the group consisting of acrylamide, n-methylol acrylamide, n-butoxymethyl acrylamide, methacrylamide and mixtures thereof.

The unsaturated monocarbonic acid monomer, as (c) monomer, may be at least one selected from maleic acid, fumaric acid, methacrylic acid, acrylic acid, glutaconic acid, itaconic acid, tetrahydrophthalic acid, crotonic acid, isocrotonic acid, nadic acid or a mixture thereof.

In the (c) monomer, a ratio of the (meth)acrylamide monomer to the unsaturated monocarbonic acid monomer is preferably 1:20 to 1:2, more preferably, 1:10 to 1:3, on the basis of weight.

As described above, the binder of the present invention comprises, in addition to the monomers, two or more cross-linking agents with different molecular weights polymerized with the monomers.

Of these, the cross-linking agent having a low molecular weight is preferably a (meth)acrylate compound or an amine compound which has two or more terminal double bonds and a molecular weight not higher than 50 and lower than 250.

For example, the (meth)acrylate compound may be at least one compound selected from the group consisting of ethylene glycol dimethacrylate, 1,3-butane diol dimethacrylate, 1,6-hexane diol dimethacrylate, aryl methacrylate (AMA), and triallyl isocyanurate (TAIC).

For example, the amine compound may be at least one compound selected from the group consisting of triallyl amine (TAA) and diallyl amine (DAA).

The cross-linking agent having a high molecular weight is preferably a (meth)acrylate compound which has two or more terminal double bonds with an oxyalkylene group and has a molecular weight not lower than 250 and lower than 20,000.

For example, the (meth)acrylate compound may be at least one compound selected from the group consisting of polyethylene glycol diacrylate, polypropylene glycol diacrylate and polybutylene glycol diacrylate.

Meanwhile, the cross-linking agents are present at a mix ratio of 1:0.1 to 1:20 (cross-linking agent having low molecular weight:cross-linking agent having large molecular weight, on the basis of weight) and is present in an amount of 0.1 to 10% by weight, based on the total weight of the binder. When the content of the cross-linking agent having a low molecular weight is excessively low, improvement of cycle characteristics cannot be obtained, and when the content of the cross-linking agent having a high molecular weight is excessively low, improvement in binder flexibility cannot be obtained. In addition, when the content of the cross-linking agents is excessively low, volume variation of the electrode upon charge/discharge cannot be controlled and capacity maintenance is thus low, and when the content of the cross-linking agents is excessively high, high adhesion strength cannot be obtained.

The binder according to the present invention may be prepared by emulsion polymerization using the monomers and the cross-linking agents. The polymerization temperature and polymerization period may be suitably determined depending on the polymerization method or polymerization initiator employed, and for example, the polymerization temperature may be from about 50° C. to 200° C. and the polymerization period may be from about 1 to about 20 hours.

Examples of the emulsifying agent used for emulsion polymerization include oleic acid, stearic acid, lauric acid, fatty acid salts such as sodium or potassium salts of mixed fatty acids and general anionic emulsifying agents such as rosin acid. Preferably, a reactive emulsifying agent to improve stability of latex may be added. The emulsifying agent may be used alone or in combination thereof.

In addition, the polymerization initiator for emulsion polymerization may be an inorganic or organic peroxide and examples thereof include water-soluble initiators including potassium persulfate, sodium persulfate and ammonium persulfate, and oil-soluble initiators including cumene hydroperoxide and benzoyl peroxide. In addition, an activating agent to promote initiation reaction of peroxide may be further included with the polymerization initiators. For example, the activating agent may be at least one selected from the group consisting of sodium formaldehyde sulfoxylate, sodium ethylenediaminetetraacetate, ferrous sulfate, dextrose and combinations thereof.

The present invention provides a slurry comprising the aforementioned electrode binder and an electrode active material capable of intercalating and de-intercalating lithium.

The slurry may contain a predetermined solvent such as water and NMP. The electrode active material will be described in more detail below.

An electrode may be fabricated by applying the slurry to a current collector, followed by drying and rolling.

Accordingly, the present invention provides an electrode for secondary batteries in which the slurry is applied to the current collector. The electrode for secondary batteries may be a cathode or an anode.

For example, the cathode is fabricated by applying a mixture consisting of a cathode active material, a conductive material and a binder to a cathode current collector, followed by drying. The anode is fabricated by applying a mixture consisting of an anode active material, a conductive material and a binder to an anode current collector, followed by drying. In some cases, the anode may comprise no conductive material.

The electrode active material is a material causing electrochemical reaction in the electrode and is divided into a cathode active material and an anode active material depending on the type of electrode.

The cathode active material is lithium transition metal oxide which includes two or more transition metals, and examples thereof include, but are not limited to, layered compounds such as lithium cobalt oxide ($LiCoO_2$) or lithium nickel oxide ($LiNiO_2$) substituted with one or more transition metals; lithium manganese oxide substituted with one or more transition metals; lithium nickel oxide represented by the formula of $LiNi_{1-y}M_yO_2$ (in which M=Co, Mn, Al, Cu, Fe, Mg, B, Cr, Zn or Ga and includes one or more elements among the elements, $0.01 \leq y \leq 0.7$); lithium nickel cobalt manganese composite oxides represented by $Li_{1+z}Ni_bMn_cCo_{1-(b+c+d)}M_dO_{(2-e)}A_e$ such as $Li_{1+z}Ni_{1/3}Co_{1/3}Mn_{1/3}O_2$ or $Li_{1+z}Ni_{0.4}Mn_{0.4}Co_{0.2}O_2$ (in which $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M=Al, Mg, Cr, Ti, Si or Y, A=F, P or Cl); and olivine lithium metal phosphate represented by the formula $Li_{1+x}M_{1-y}M'_yPO_{4-z}X_z$ (in which M=transition metal, preferably Fe, Mn, Co or Ni, M'=Al, Mg or Ti, X=F, S or N, $-0.5 \leq x \leq +0.5$, $0 \leq y \leq 0.5$, and $0 \leq z \leq 0.1$).

Examples of the anode active material include carbon and graphite materials such as natural graphite, artificial graphite, expanded graphite, carbon fiber, hard carbon, carbon black, carbon nanotubes, perylene, activated carbon; metals alloyable with lithium, such as Al, Si, Sn, Ag, Bi, Mg, Zn, In, Ge, Pb, Pd, Pt and Ti and compounds containing these elements; composites of carbon and graphite materials with a metal and a compound thereof; and lithium-containing nitrides. Of these, a carbon-based active material, a silicon-based active material, a tin-based active material, or a silicon-carbon-based active material are more preferred. The material may be used alone or in combination of two or more thereof.

The conductive material serves to further improve the electrode active material and is commonly added in an amount of 0.01 to 30% by weight, based on the total weight of the electrode mix. Any conductive material may be used without particular limitation so long as it has suitable conductivity without causing adverse chemical changes in the fabricated secondary battery. Examples of conductive materials that can be used in the present invention include conductive materials, including graphite such as natural or artificial graphite; carbon blacks such as carbon black, acetylene black, Ketjen black, channel black, furnace black, lamp black and thermal black; carbon derivatives such as carbon nanotubes or fullerene; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and conductive materials such as polyphenylene derivatives. The current collector in the electrode is a material causing electrochemical reaction and is divided into a cathode current collector and an anode current collector depending on the type of electrode.

The cathode current collector is generally fabricated to have a thickness of 3 to 500 μm. There is no particular limit to the cathode current collector, so long as it has suitable conductivity without causing adverse chemical changes in the fabricated battery. As examples of the cathode current collector, mention may be made of stainless steel, aluminum, nickel, titanium, sintered carbon, and aluminum or stainless steel surface-treated with carbon, nickel, titanium, silver or the like.

The anode current collector is generally fabricated to have a thickness of 3 to 500 μm. There is no particular limit to the anode current collector, so long as it has suitable conductivity without causing adverse chemical changes in the fabricated battery. As examples of the anode current collector, mention may be made of copper, stainless steel, aluminum, nickel, titanium, sintered carbon, and copper or stainless steel surface-treated with carbon, nickel, titanium, silver, or the like, and aluminum-cadmium alloys.

These current collectors include fine irregularities on the surface thereof so as to enhance adhesion to electrode active materials. In addition, the current collectors may be used in various forms including films, sheets, foils, nets, porous structures, foams and non-woven fabrics.

The mixture (electrode mix) of an electrode active material, a conductive material and a binder may further comprise at least one selected from the group consisting of a viscosity controller and a filler.

The viscosity controller controls the viscosity of the electrode mix so as to facilitate mixing of the electrode mix and application thereof to the current collector and may be added in an amount of 30% by weight, based on the total weight of the electrode mix. Examples of the viscosity controller include, but are not limited to, carboxymethylcellulose, polyacrylic acid and polyvinylidene fluoride. If necessary, the solvent may also serve as a viscosity controller.

The filler is a component used to inhibit expansion of the electrode. There is no particular limit to the filler, so long as it does not cause adverse chemical changes in the fabricated battery and is a fibrous material. As examples of the filler, there may be used olefin polymers such as polyethylene and polypropylene; and fibrous materials such as glass fibers and carbon fibers.

The present invention also provides a lithium secondary battery comprising the electrode for secondary batteries.

The lithium secondary battery generally further comprises a separator and a lithium salt-containing non-aqueous electrolyte, in addition to the electrodes.

The separator is interposed between the cathode and anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing, non-aqueous electrolyte is composed of a non-aqueous electrolyte and a lithium salt.

As the non-aqueous electrolytic solution that can be used in the present invention, for example, mention may be made of non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

The lithium salt is a material that is readily soluble in the above-mentioned non-aqueous electrolyte and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imides.

An organic solid electrolyte or an inorganic solid electrolyte may be used, if necessary.

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte utilized in the present invention, mention may be made of nitrides, halides and sulfates of lithium such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH and $Li_3PO_4$—$Li_2S$—$SiS_2$.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further comprise halogen-containing solvents such as carbon tetrachloride and ethylene trifluoride. Further, in order to improve high-temperature storage characteristics, the non-aqueous electrolyte may additionally include carbon dioxide gas, fluoro-ethylene carbonate (FEC), propene sultone (PRS) or fluoro-ethylene carbonate (FEC).

The secondary batteries according to the present invention may be used as a power source of electric vehicles (EV) or hybrid electric vehicles (REV) which require long cycle properties, high rate properties and the like.

Advantageous Effects

As apparent from the foregoing, the binder for secondary battery electrodes according to the present invention comprises polymer particles obtained by polymerizing a specific combination of monomers with two or more cross-linking agents with different molecular weights and thus provides improved cycle properties and high adhesion strength.

BEST MODE

Now, the present invention will be described in more detail with reference to the following Examples. These examples are provided only to illustrate the present invention and should not be construed as limiting the scope and spirit of the present invention.

EXAMPLE 1

Butyl acrylate (60 g), styrene (30 g), acrylic acid (5 g) and acryl amide (1 g) as monomers were added to water containing ethylene glycol dimethacrylate (0.5 g) and polyethylene glycol dimethacrylate (0.5 g) having a molecular weight of 400, as cross-linking agents, sodium lauryl sulfate as an emulsifying agent and potassium persulfate as a polymerization initiator, and these ingredients were mixed and polymerized at 70° C. for about 5 hours. A binder for secondary battery electrodes containing polymer particles obtained by polymerizing the monomers with the cross-linking agents was prepared through polymerization.

EXAMPLE 2

A binder for secondary battery electrodes was prepared in the same manner as in Example 1 except that 2-ethylhexylacrylate was used as a monomer, instead of butylacrylate.

EXAMPLE 3

A binder for secondary battery electrodes was prepared in the same manner as in Example 1 except that acrylonitrile was used as a monomer, instead of styrene.

COMPARATIVE EXAMPLE 1

A binder for secondary battery electrodes was prepared in the same manner as in Example 1 except that acrylic acid (5 g) was used as a monomer.

COMPARATIVE EXAMPLE 2

A binder for secondary battery electrodes was prepared in the same manner as in Example 1 except that acrylonitrile (1 g) was not used as a monomer.

COMPARATIVE EXAMPLE 3

A binder for secondary battery electrodes was prepared in the same manner as in Example 1 except that acrylic acid (5 g) and acrylamide (1 g) were not used as monomers.

EXPERIMENTAL EXAMPLE 1

Adhesion Strength Test

In the case where the polymer binder according to the present invention was used as an anode binder for lithium secondary batteries, adhesion strength between an electrode active material and a current collector was measured.

First, for the binders of Examples 1 to 3 and the binders of Comparative Examples 1 to 3, an active material, a viscosity controller and the binder were mixed in a ratio of 97:1:2 to prepare a slurry and the slurry was coated on an Al foil to fabricate an electrode.

The surface of the electrode thus fabricated was cut and fixed to a glass slide and 180 degree peel strength was measured, while the current collector was peeled off. The results thus obtained are shown in Table 1. Evaluation was based on an average of five or more peel strengths.

TABLE 1

|  | Adhesion strength (g) |
|---|---|
| Ex. 1 | 41 |
| Ex. 2 | 44 |
| Ex. 3 | 40 |
| Comp. Ex. 1 | 33 |
| Comp. Ex. 2 | 35 |
| Comp. Ex. 3 | 32 |

As can be seen from Table 1 above, electrodes employing the binders of Examples 1 to 3 according to the present invention exhibited considerably high adhesion strength, as compared to electrodes employing the binders of Comparative Examples 1 to 3. It can be seen that adhesion strength can be greatly improved by adding the unsaturated monocarbonic monomer and the (meth)acrylamide monomer.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A binder for secondary battery electrodes comprising polymer particles obtained by polymerizing (a) a (meth) acrylic acid ester monomer; (b) at least one monomer selected from the group consisting of an acrylate monomer, a vinyl monomer and a nitrile monomer; and (c) a (meth)acrylamide monomer and a unsaturated monocarbonic acid monomer, with two or more cross-linking agents with different molecular weights,
wherein the cross-linking agents comprise the cross-linking agent having a low molecular weight not lower than 50 and lower than 250 and the cross-linking agent having a high molecular weight not lower than 250 and lower than 20,000, and are present at a mix ratio of cross-linking agent having low molecular weight:cross-linking agent having high molecular weight, on a weight basis from 1:0.1 to 1:20.

2. The binder according to claim 1, wherein, (a) monomer is present in an amount of 10 to 98% by weight, (b) monomer is present in an amount of 1 to 60% by weight, and (c) monomer is present in an amount of 1 to 20% by weight, based on the total weight of the binder.

3. The binder according to claim 1, wherein the (meth) acrylic acid ester monomer is at least one monomer selected from the group consisting of methyl acrylate, ethyl acrylate, propyl acrylate, isopropyl acrylate, n-butyl acrylate, isobutyl acrylate, n-amyl acrylate, isoamyl acrylate, n-ethyl hexyl acrylate, 2-ethyl hexyl acrylate, 2-hydroxy ethyl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, n-ethyl hexyl methacrylate, 2-ethyl hexyl methacrylate, hydroxyethyl methacrylate and hydroxypropyl methacrylate.

4. The binder according to claim 1, wherein the acrylate monomer is selected from the group consisting of methacryloxy ethylethylene urea, β-carboxy ethylacrylate, aliphatic monoacrylate, dipropylene diacrylate, ditrimethylolpropane tetraacrylate, hydroxyethyl acrylate, dipentaerythritol hexaacrylate, pentaerythritol triacrylate, pentaerythritol tetraacrylate, lauryl acrylate, cetyl acrylate, stearyl acrylate, lauryl methacrylate, cetyl methacrylate and stearyl methacrylate.

5. The binder according to claim 1, wherein the nitrile monomer is at least one selected from the group consisting of succinonitrile, sebaconitrile, fluoronitrile, chloronitrile, acrylonitrile, methacrylonitrile and the like.

6. The binder according to claim 1, wherein the vinyl monomer is at least one selected from the group consisting of styrene, α-methylstyrene, β-methylstyrene, p-t-butylstyrene, divinyl benzene and mixtures thereof.

7. The binder according to claim 1, wherein the (meth) acrylamide monomer is at least one selected from the group consisting of acrylamide, n-methylol acrylamide, n-butoxymethyl acrylamide, methacrylamide and mixtures thereof.

8. The binder according to claim 1, wherein the unsaturated monocarbonic acid monomer is at least one selected from maleic acid, fumaric acid, methacrylic acid, acrylic acid, glutaconic acid, itaconic acid, tetrahydrophthalic acid, crotonic acid, isocrotonic acid, nadic acid or a mixture thereof.

9. The binder according to claim 1, wherein a ratio of the (meth)acrylamide monomer to the unsaturated monocarbonic acid monomer is preferably 1:20 to 1:2, on the basis of weight.

10. The binder according to claim 1, wherein, of the cross-linking agents, the cross-linking agent having a low molecular weight is a (meth)acrylate compound or an amine compound which has two or more terminal double bonds.

11. The binder according to claim 10, wherein, the (meth) acrylate compound is at least one compound selected from the group consisting of ethylene glycol dimethacrylate, 1,3-butane diol dimethacrylate, 1,6-hexane diol dimethacrylate, aryl methacrylate (AMA), and triallyl isocyanurate (TAIC).

12. The binder according to claim 10, wherein the amine compound is at least one compound selected from the group consisting of triallyl amine (TAA) and diallyl amine (DAA).

13. The binder according to claim 1, wherein, of the cross-linking agents, the cross-linking agent having a high molecular weight is a (meth)acrylate compound which has two or more terminal double bonds with an oxyalkylene group.

14. The binder according to claim 13, wherein the (meth) acrylate compound is at least one compound selected from the group consisting of polyethylene glycol diacrylate, polypropylene glycol diacrylate and polybutylene glycol diacrylate.

15. The binder according to claim 13, wherein the cross-linking agents are present in an amount of 0.1 to 10% by weight, based on the total weight of the binder.

16. A slurry for electrodes comprising:
(a) the binder for electrodes according to claim 1; and
(b) an electrode active material capable of intercalating and de-intercalating lithium.

17. An electrode for secondary batteries, in which the slurry for electrodes according to claim 16 is applied to a current collector.

18. A lithium secondary battery comprising the electrode for secondary batteries according to claim 17.

* * * * *